United States Patent

[11] 3,622,343

| [72] | Inventors | Mohammad H. Anwar<br>Tappan;<br>Marvin Calderon, Queens, both of N.Y. |
|---|---|---|
| [21] | Appl. No. | 329,968 |
| [22] | Filed | Dec. 12, 1963 |
| [45] | Patented | Nov. 23, 1971 |
| [73] | Assignee | Pepsico, Inc.<br>Long Island City, N.Y. |

[54] EMULSIONS OF FLAVORING OILS AND PROCESS FOR MAKING SAME
12 Claims, No Drawings

[52] U.S. Cl. .................................................. 99/78,
99/79, 99/140, 424/361, 252/351, 252/356, 252/312
[51] Int. Cl. ...................................................... A23l 1/22,
A23l 1/00

[50] Field of Search........................................... 99/140, 78, 148, 141, 142, 79; 167/82.7

[56] References Cited
UNITED STATES PATENTS
2,021,027  11/1935  Suell et al. .................... 99/140 X
OTHER REFERENCES
Jacobs, Manufacture and Analysis of Carbonated Beverages, 1959, Chemical Publ. Co., New York, pp. 128, 129, 131, 156, 157, 160, 161, 181

*Primary Examiner*—Joseph M. Golian
*Attorney*—Roylance, Abrams, Kruger, Berdo and Kaul

ABSTRACT: Caramel is used as an emulsifying agent in preparing an aqueous emulsion of a water insoluble flavoring oil. The emulsion is utilized in preparing flavored beverage syrups and flavored beverages.

EMULSIONS OF FLAVORING OILS AND PROCESS FOR MAKING SAME

This invention relates to emulsions of flavoring oils.

In the preparation of flavored beverages, many of the flavoring ingredients used are oils which are substantially insoluble in water. Therefore, in order to prepare a beverage using one or more flavoring oils, it is necessary that these flavoring oils be in the form of aqueous emulsions. Since these emulsions must be diluted many times their original volume with water in the preparation of a beverage, they must be stable and capable of easy dilution.

Emulsions of flavoring oils are prepared by forming an aqueous admixture of the oil and a natural gum such as gum acacia, gum tragacanth, gum karaya or ghatti gum. This admixture is then run through a homogenizer which forces the mixture through a very small opening (e.g., 0.003 to 0.01 inch) under a high pressure (e.g., 1,000 to 10,000 pounds per square inch). The oil is thereby broken up into very fine particles which become coated with gum. These particles do not coalesce but stay in aqueous suspension. The emulsion of flavoring oil is then formulated into a syrup by the addition of water and other ingredients such as water soluble flavors, acids, colors, preservatives, thickening agents, etc. This syrup is then used by the bottler to prepare the final beverage by adding the syrup to a necessary amount of water or carbonated water.

If the emulsion of flavoring oil has not been properly prepared, the oil will separate from the aqueous phase either in the syrup or after the syrup has been diluted in the preparation of a flavored beverage.

The use of natural gums as emulsifying agents in the preparation of emulsions of flavoring oils possesses certain disadvantages. Natural gums, such as gum acacia, are not commercially available in a high degree of purity. Thus, these gums may contain contaminants such as gritty material (e.g., sand), micro-organisms, and enzymes. Any gritty material is harmful to the homogenizer since it will tend Mar. mar and score the orifice. The presence of micro-organisms may cause scums, clouds, sediments, etc., to form in the syrup or the final beverage. Enzymes, such as oxidases, peroxidases, catalases, etc., also produce deleterious effects on the syrup or final beverage such as by causing the oxidation or polymerization of the flavoring oils, thereby altering their flavoring and other characteristics.

It is an object of this invention to provide a stable, easy to dilute emulsion of a water insoluble material. It is another object of this invention to provide an aqueous emulsion of flavoring oils which does not contain contaminants such as may be present in natural gums. It is a further object of this invention to provide an aqueous emulsion of flavoring oils suitable for use in the preparation of a flavored beverage, which contains substantially no natural gum or other emulsifying agent which would not otherwise be present in the flavored beverage.

These, and other objects, are accomplished by the practice of this invention which, briefly, comprises providing an aqueous emulsion comprising at least one water insoluble flavoring agent and an emulsifying amount of an emulsifying agent consisting essentially of caramel. The weight ratio of caramel solids to flavoring agent is preferably at least 5 to 1. Such an emulsion is prepared in accordance with the practice of this invention by forming an aqueous admixture of the water insoluble flavoring agent and an emulsifying amount of caramel, and subsequently emulsifying the mixture such as by putting it through a homogenizer.

The water insoluble flavoring agents which may be used in the practice of this invention include those essential oils which are well known for use as flavoring agents such as, for example, orange oil, lemon oil, distilled lime oil, grapefruit oil, and other citrus oils, clove oil, peppermint oil, ginger oil, dill oil, anise oil, bay oil, sweet birch oil, rosewood oil, wintergreen oil, cassia oil, cinnamon oil, lemongrass oil, teaseed oil, sassafras oil, etc. Mixtures of the various flavoring agents may be used.

Caramel which may be used in practice of this invention is a well-known and staple commercial material. It is an amorphous, dark-brown material resulting from the carefully controlled heat treatment of saccharine materials such as dextrose, invert sugar, lactose, malt syrup, molasses, sucrose, starch hydrolysates and fractions thereof, etc. Other materials may be employed during the heat treatment to assist carmelization such as acids (e.g., (e.g., acetic acid, citric acid, phosphoric acid, sulfuric acid and sulfurous acid); alkalis (e.g., ammonium hydroxide, potassium hydroxide and sodium hydroxide); and salts (e.g., ammonium, sodium or potassium carbonates, bicarbonates, dibasic phosphates or monobasic phosphates). Commercial caramel is available in the form of aqueous solutions or syrups of varying Baumé, the gravity generally being between about 25° to 40° Baumé. In a preferred embodiment of this invention, an aqueous solution of caramel is used which has a Baumé of from about 29° to 37°. This corresponds to a solids content of from about 53 to 69 percent by weight.

The water insoluble flavoring agent may be added to the caramel syrup or the caramel syrup may be added to the water insoluble flavoring agent. In any event, sufficient caramel solids must be present to emulsify the flavoring agent. The amount of caramel solids required to emulsify the water insoluble flavoring agent will depend upon the particular type of flavoring agent used. Thus, an agent which contains a high percentage of terpenes, such as orange oil, is more difficult to emulsify and will require a greater proportion of caramel solids to emulsify it than an agent containing a small concentration of terpenes, such as distilled lime oil. There is no upper limit on the amount of caramel which may be used, since an emulsion of the water insoluble flavoring agent may be formed using many times the minimum amount of caramel required. However, when forming the emulsion, it is generally desirable to work with as low of a volume of material as possible. Therefore, amounts of caramel greatly in excess of that required to emulsify the flavoring agent are preferably not used. For the same reason, a large amount of extra water is preferably not used. Generally, all of the water which is necessary to serve as the aqueous phase for the emulsification of the flavoring agent is present in the volume of caramel syrup used. However, additional water may be added if necessary to adjust the viscosity of the mixture.

The aqueous admixture of caramel and flavoring agent is then emulsified. The emulsification may be accomplished by means of a homogenizer, a colloid mill, a turbine-type agitator or any other such apparatus which are well known in the art. During the emulsification, the water insoluble flavoring agent is broken up into very small particles with diameters ranging from as high as 10 microns to below 1 micron. It is preferred that the average diameter of these particles be less than about 3 microns.

The aqueous emulsion of water insoluble flavoring agent and caramel may then be added to a previously prepared larger volume of sugar syrup to make a flavored syrup. The syrup may also contain other adjuvants which are commonly used in flavoring syrups such as colors, acids (e.g., citric acid, phosphoric acid or tartaric acid), water soluble flavors, thickening agents, etc. This syrup may then be diluted several times with plain or carbonated water to make the final flavored beverage of the type in which caramel is normally used as a coloring agent such as, for example, root beer, cream soda, ginger ale or cola.

The advantages obtained by the practice of this invention are manifold. The elimination of natural gum in the preparation of an emulsion of a water insoluble flavoring agent makes possible a substantial saving in terms of buying, storing, processing and purifying of natural gum. The emulsions of this invention may be formed with less likelihood of damage to processing machinery than when a natural gum is used as the emulsifying agent since there will be no gritty material present in the caramel. Moreover, the elimination of a natural gum from the emulsion also eliminates micro-organisms and enzymes which are present in the natural gum. Therefore, the emulsions of this invention, and flavored beverages made therefrom are not subject to the deleterious effects caused by enzymes and micro-organisms which are present in natural gums. The emulsions of this invention possess smaller particle size and exhibit less tendency to cream than an emulsion using a natural gum as the emulsifying agent.

The following examples illustrate the best modes contemplated for carrying out this invention:

EXAMPLE I

To 100 gallons of commercial beverage caramel having a solids content of about 60 percent there are added 5 gallons of orange oil. This mixture is put through a Manton Gaulin homogenizer which reduces the oil to small particles having an average particle size less than 3 microns. The resultant emulsion of orange oil is very stable.

In a separate tank, there are mixed in sufficient water to make 500 gallons of syrup, the following ingredients: 36 pounds of citric acid, 30 pounds of sodium citrate, 25 pounds of sodium benzoate, 2,500 pounds of sucrose, 0.5 pound of gum tragacanth and 10 gallons of the emulsion of orange oil prepared as described above. This syrup is then diluted to 6 times its original volume with carbonated water to form an orange flavored beverage.

EXAMPLE II

To 100 gallons of commercial beverage caramel having a solids content of about 55 percent there are added 7 gallons of distilled lime oil and 3 gallons of lemon oil. This mixture is put through a homogenizer which reduces the oils to small particles having an average particle size less than 2 microns. This emulsion is then formulated into a flavored beverage as described in example I.

EXAMPLE III

To 350 gallons of commercial beverage caramel having a Baumé of about 35° there is added a mixture of 5 gallons of orange oil and 1 gallon of oil of ginger. The mixture is put through a homogenizer to form a stable, aqueous emulsion of the flavoring oils.

While the emulsions of this invention have been exemplified for use in flavored beverages, they are not limited to such use. Thus, emulsions of water insoluble flavoring agents prepared in accordance with the practice of this invention may also be used in the preparation of baked goods, candies, etc., where caramel is normally used as a coloring agent.

Moreover, the practice of this invention may be used to emulsify water insoluble materials other than flavoring oils. Thus, caramel may be used to emulsify the water insoluble components which are used in the preparation of pharmaceutical ointments, creams or lotions, hair dressings, suntan oils, cough syrups, polishes, etc., in which the color imparted by the caramel will not be objectionable.

We claim:

1. A stable aqueous emulsion consisting essentially of at least one water insoluble flavoring oil and an emulsifying amount of an emulsifying agent consisting essentially of caramel, the average particle size of the flavoring oil in said aqueous emulsion being less than 10 microns.

2. A stable aqueous emulsion consisting essentially of at least one flavoring oil and an emulsifying amount of an emulsifying agent consisting essentially of caramel, the weight ratio of caramel solids to flavoring oil being at least 5 to 1, the average particle size of the flavoring oil in said aqueous emulsion being less than 3 microns.

3. The aqueous emulsion of claim 2 wherein said flavoring oil is an essential oil.

4. A flavored syrup obtained by diluting the emulsion of claim 2 with water.

5. A flavored beverage obtained by diluting the syrup of claim 4 with water.

6. A stable aqueous emulsion consisting essentially of at least one flavoring oil and an emulsifying amount of an emulsifying agent consisting of caramel, the weight ratio of caramel solids to flavoring oil being at least 5 to 1, the average particle size of the flavoring oil in said aqueous emulsion being less than 3 microns.

7. A stable aqueous emulsion consisting essentially of at least one water insoluble oil and an emulsifying amount of an emulsifying agent consisting essentially of caramel, the average particle size of the oil in said aqueous emulsion being less than 10 microns.

8. A process for preparing a stable emulsion which comprises forming an aqueous admixture consisting essentially of at least one water insoluble oil and an emulsifying amount of an emulsifying agent consisting essentially of caramel, and subsequently emulsifying said admixture to reduce the average particle size of said oil to less than 10 microns.

9. A process for preparing a stable emulsion of a flavoring oil which comprises adding at least one flavoring oil to an aqueous solution consisting essentially of caramel and water, said solution being between about 25° to 40° Baumé, the weight ratio of the caramel solids in said solution to the flavoring oil being at least 5 to 1, and subsequently emulsifying the mixture to reduce the average particle size of said oil to less than 3 microns.

10. The process of claim 9 wherein said aqueous solution has a gravity between about 29° to 37° Baumé.

11. The process of claim 9 wherein the mixture is emulsified by putting it through a homogenizer.

12. A stable aqueous emulsion consisting essentially of at least one edible oil and an emulsifying amount of caramel, said caramel being the only emulsifying agent for said edible oil in said emulsion.

* * * * *